May 4, 1954
T. C. LENNOX
2,677,810
STEP VOLTAGE REGULATOR
Filed Oct. 14, 1950
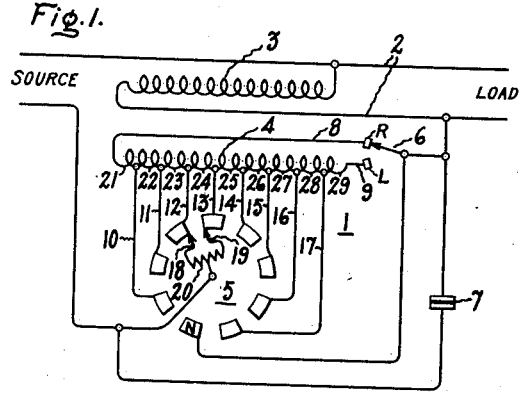
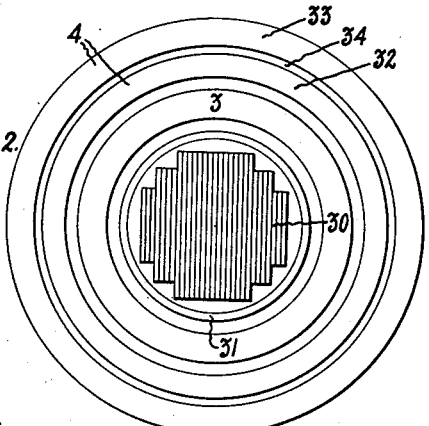
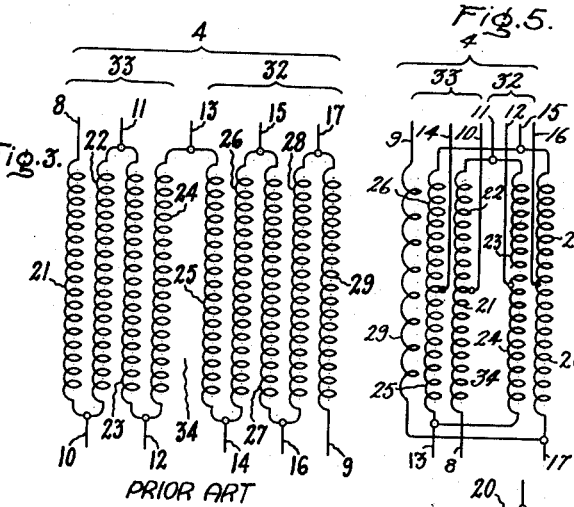
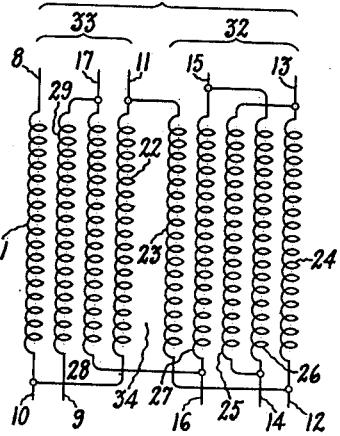
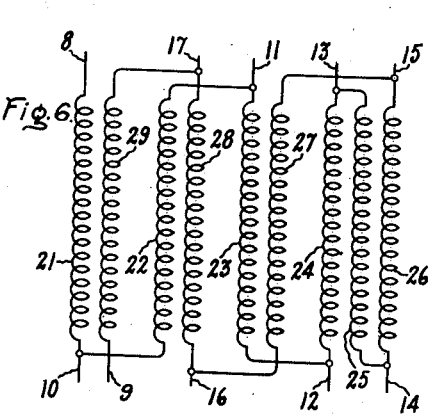
Inventor:
Thomas C. Lennox,
by Ernest C. Britton
His Attorney.

Patented May 4, 1954

2,677,810

UNITED STATES PATENT OFFICE 2,677,810

STEP VOLTAGE REGULATOR

Thomas C. Lennox, Pittsfield, Mass., assignor to General Electric Company, a corporation of New York Application October 14, 1950, Serial No. 190,101

13 Claims. (Cl. 336—148)

This invention relates to step voltage regulators and, more particularly, to improvements in the series windings for such regulators.

As used herein, the term "step voltage regulator" denotes an autotransformer having a shunt winding for connection across an alternating current power circuit whose voltage is to be regulated and a multi-tap series winding, selective portions of which are connected in series in said circuit by means of a tap changing-under-load switching mechanism. Usually, the switching mechanism also includes means for reversing the connections or effective polarity of the series winding so that variable amounts of the voltage of the series winding, up to its full voltage, are available for both raising and lowering the circuit voltage. A preferred electrical relationship of the windings is to have the series winding connected in the circuit on the source or supply side of the shunt winding so that, when the regulator is controlled to maintain constant voltage on its load side, the voltage across the shunt winding remains constant. This means that the flux density of the magnetic core for the windings remains substantially constant throughout the range of the operation of the regulator so that the volts per turn of the windings is a constant and it is, thus, convenient to mount an auxiliary winding on the regulator for supplying a voltage regulating relay and a driving motor with current when the regulator is automatically controlled. Sometimes a line drop compensator is included in the automatic control equipment, in which case the voltage of the shunt winding of the regulator will vary slightly with variations in load current through the regulator.

From the well-known fact that the load volt-amperes of the primary and secondary windings of any transformer, including an autotransformer, are alway equal, it can easily be demonstrated that the load volt-amperes of the shunt and series windings of a step voltage regulator are always equal. From this it follows that, when only a part of the series winding of a step voltage regulator is carrying load current, the maximum safe value of current can be increased without overheating the shunt winding. For example, if the regulator has only half of its series winding in the circuit so as to produce only a 50% regulating voltage, the current through the regulator can, in principle, be doubled without exceeding the 100% rated volt-amperes or ampere-turns of the two windings of the regulator. However, in practice, it has been found that this double current rating, when the regulator is only producing half its total or rated regulating voltage, is not realizable for a number of reasons.

In the first place, it is common practice to divide the series winding into two radially spaced, generally concentric coils having the same number of turns. As each coil has two sides, there are four coil side surfaces available for carrying off heat from the entire winding. However, when only half of the series winding is being used, then all of the load current flows through only one of the coils and, if double rated current is passed through this single coil, the heating effect due to the resistance loss in the winding not only is doubled because twice the rated current is flowing through half the resistance of the entire winding, but, worse still, the watts per square inch to be passed through the surfaces of the coil sides is four times normal because the double watts loss in the winding can only escape through half the coil sides of the total winding, that is to say, only through the coil sides of one coil. Therefore, it is heating in the series winding, rather than in the shunt winding which limits the up-rating of the current which can be made when the regulator is not in its maximum raise or lower positions.

In the second place, due to the difference in the relationship between the series and shunt windings, when the regulator is connected for raising and for lowering the circuit voltage, the series winding will carry materially different values of current for the same value of load current. When the series winding is connected in the circuit for lowering the load voltage, the connection is that of a voltage step-down autotransformer in which the series and shunt windings have additive polarity so that the series and shunt windings together constitute the primary winding of the autotransformer, whereas the shunt winding alone constitutes the common winding of the autotransformer which, in this instance, is also the secondary winding. In such a connection, the series winding carries the load current minus the component of current in the common or shunt winding produced by the load current. On the other hand, when the regulator is connected for raising the circuit voltage, the effective polarity of the series winding is reversed so that the connection is the equivalent of a voltage step-up autotransformer in which the turns of the shunt winding minus the turns of the series winding correspond to the primary winding of the autotransformer and correspond to the common winding of the autotransformer, whereas the entire shunt winding corresponds to the secondary winding of the autotransformer.

With this connection, the series winding is in the low voltage, and therefore high current, side of the circuit and it carries the load current plus the load component of the current in the shunt winding.

In accordance with the present invention, there is provided a new and improved construction of the series winding of a step voltage regulator so as to provide increased cooling surface area when only a fraction, such as either electrical half of the winding, is active and for also increasing the heat dissipating ability of the half or portion of the winding which is used for fractional voltage raising relative to the heat dissipating ability of the portion of the winding which is used for fractional voltage lowering. Generally speaking, those portions of the winding are distributed in a certain way among a plurality of coils so that not only is the heat dissipating ability of each half of the winding increased, but also the heating of the two halves with the same value of load current during fractional voltage raising and fractional voltage lowering is more nearly equalized.

The invention will be better understood from the following description taken in connection with the accompanying drawing and its scope will be pointed out in the appended claims.

In the drawing, Fig. 1 is a diagrammatic representation of a conventional step voltage regulator with which the present invention may be used, Fig. 2 is a sectional view of the core and coil assembly of the regulator shown in Fig. 1, Fig. 3 illustrates diagrammatically the electrical and physical make-up of the secondary winding of the regulator shown in Figs. 1 and 2, Fig. 4 illustrates diagrammatically the electrical and physical make-up of a preferred form of the series winding in accordance with the present invention, Fig. 5 is a modification of Fig. 4 in which the series winding has five layers instead of nine, Fig. 6 is another modification of Fig. 4 in which the series winding is divided into four instead of two coils, and Fig. 7 illustrates a modified form of series winding for use in a different kind of tap changing-under-load circuit for a step voltage regulator in which the winding is provided with an odd instead of an even number of taps.

Referring now to the drawing, and more particularly to Fig. 1, there is shown therein a step voltage regulator designated generally by the reference numeral 1 for regulating the voltage of an alternating current circuit 2. This regulator comprises a shunt winding 3 connected across the circuit 2 and a multi-tap series winding 4, selective portions of which are actively connected serially in the circuit 2 by means of a tap changing underload switch 5 in combination with a reversing switch 6. The preferred source and load ends of the circuit 2 are indicated in Fig. 1 and the series winding 4 is preferably connected in the circuit on the source side of the shunt winding 3.

As is conventional practice, a lightning arrester type of nonlinear resistor 7 is connected to by-pass the series winding 4 so as to protect it against surges in the line or circuit 2 which may be caused by lightning.

The series winding 4 is provided with a plurality of taps including what will be called a raise end tap 8, a lower end tap 9, and a plurality of electrically equidistant intermediate taps 10, 11, 12, 13, 14, 15, 16, and 17. The raise end tap 8 is connected to a raise contact R of the reversing switch 6 and the lower end tap 9 is connected to a lower contact L of the reversing switch circuit 6, while the intermediate taps are connected respectively to unnumbered fixed contacts of the dial type tap changing switch 5. This switch has an additinoal neutral position contact N which is connected to the common or movable contact of the reversing switch 6.

For preventing interruption of the load current during tap changing operations and for providing intermediate voltage steps between those of the taps, the dial switch 5 is provided with a two-finger movable contact having spaced contact fingers 18 and 19 which, respectively, engage the circularly arranged fixed contacts and which are interconnected by means of a midtap reactor or autotransformer 20 whose midpoint is connected directly to the circuit 2.

It will be observed that the winding 4 is provided with an even number of intermediate taps, namely eight, which divide the winding into an odd number of sections, namely nine, designated, respectively, by the reference numerals 21, 22, 23, 24, 25, 26, 27, 28, and 29.

In the position of the regulator shown in Fig. 1, the contact finger 18 makes connection to the tap 12 and the contact finger 19 makes connection to the tap 13 so that, in effect, one side of the supply circuit is connected to the winding 4 at the midpoint of the section 24 so that the left half of this section, together with sections 23, 22, and 21, are connected serially in the circuit by way of the reversing switch 6. If the movable contacts of the dial switch 5 are rotated clockwise, as shown in the drawing, all of section 24 will be inserted in the circuit when the movable contact 18 makes connection with the tap 13. In the next bridging position, the contact 19 will make connection to the tap 14 so that, in effect, half of the section 25 will be connected in the circuit. In this manner, the voltage raising action of the regulator will be increased progressively in alternate half cycle and full cycle positions of the regulator until both contacts 18 and 19 make connection with tap 17, in which position the regulator will be at its full raise or boost position. If the movable contacts of the dial switch 5 are rotated counterclockwise, the sections 24, 23, and 22 will be progressively removed from the circuit until, when both contact fingers 18 and 19 engage the neutral contact N, all of the series winding 4 will be out of the circuit and the load current will flow directly from the source side through the two halves of the reactor 20, the contact fingers 18 and 19 in parallel, the neutral contact N to the load side of the circuit through the common contact of the reversing switch 6. In this neutral position of the regulator, the reversing switch 6 is carrying no current and, therefore, its movable contact can be moved from R to L without any arcing. Continued counterclockwise rotation of the movable contact assembly of the switch 5 will now produce a progressively increasing voltage lowering action of the regulator by progressively inserting half the section 29 of the series winding on the circuit, then all of the section 29, then adding half of the section 28, then all of the section 28, etc. until the regulator reaches its maximum lowering position when both movable contact fingers 18 and 19 make connection with the tap 10.

Fig. 2 shows how the various windings of the regulator may be mounted on a magnetic core. In this figure, only the cross-section of the winding leg 30 of the core has been shown. Immediately surrounding this core leg is an auxiliary winding 31 for supplying suitable automatic control equipment for the regulator. Radially spaced therefrom and generally concentric therewith is the shunt winding 3. Radially spaced from and generally concentric with the shunt winding 3 is the series winding 4 which is divided into two radially spaced coils 32 and 33, with a duct 34 therebetween for cooling purposes.

Fig. 3 shows how the sections of the secondary winding 4 are conventionally arranged in layers, all of which normally have the same number of turns so that the intermediate taps may be connected to the junctions between the sections at the ends of the respective layers. As shown in Fig. 3, sections or layers 21, 22, 23, 24 constitute the outer coil 33 of the secondary winding 4 and layers or sections 25, 26, 27, 28, and 29 constitute the inner coil 32 of the secondary winding 4. It will be seen that all nine layers or sections are serially connected between the raise end tap 8 and the lower end tap 9. Fig. 3 may also be taken to represent the radial relationship of the respective layers, it being assumed that layer 21 is the outermost layer of coil 33 and layer 29 is the innermost layer of coil 32.

When all of the winding 4 is carrying load current so that the regulator is in either its full voltage raising position or its full voltage lowering position, the two sides of both the coils 32 and 33 will be available for conducting heat away from the winding. If, however, the regulator is in its 50% voltage raising position wherein the contact fingers 18 and 19 of Fig. 1 make connection with the tap 13, with the reversing switch 6 in its illustrated position, all of the load current flows through winding sections 21, 22, 23, and 24 in series and none of the load current flows through the remaining sections. If then the load current is doubled, the resistance loss in these four sections of the winding will be double the resistance loss at rated 100% current in the entire winding and this doubled resistance loss will have to be dissipated through only the two sides of the coil 33 so that four times as many watts per square inch will have to be dissipated. Likewise, if the regulator is in its 50% voltage lowering position wherein the contact fingers 18 and 19 both make connection to the tap 14 and the reversing switch 6 is moved to its bottom position so as to make connection to the lower end tap 9, then all of the load current will flow through the four sections 26, 27, 28, and 29 in series and none of the other coil sections will be active. In this condition of the regulator, the heat dissipating ability of the coil 32 will not be quite as good as that of the coil 33 because the layer 26 will be separated from the outer side of the coil 32 by the layer 25 which, with its electrical insulation, will act as thermal insulation.

It will be observed from the above description that the center coil section or layer 25 is not active when the regulator is connected for 50% voltage raising or 50% voltage lowering action. The reason for this is that all nine sections of the winding are not used during 100% voltage raising or voltage lowering action of the regulator. Thus, for example, in the 100% voltage raising position of the regulator, the contact fingers 18 and 19 make connection to the tap 17 with the reversing switch in the illustrated position so that section 29 is not in circuit with the result that only eight of the nine sections of the secondary winding 4 are active. The same thing is true for the 100% lowering position of the regulator, except that in that case the section 21 is inactive. Consequently, as only eight of the nine sections are used for 100% voltage raising and voltage lowering, only four of the sections will be used for 50% voltage raising and voltage lowering.

Fig. 4 shows how the nine coil sections or layers are reconnected in accordance with an embodiment of the present invention so as to provide more effective cooling and increased current carrying capacity when the regulator is providing fractional, typically 50%, voltage raising or lowering action. In this figure, it will be observed that, while the nine sections or layers are all serially connected between the raise end tap 8 and the lower end tap 9, their distribution in each of the coils 32 and 33 and among the coils 32 and 33 is very different from that shown in Fig. 3. The connections and position of layer 21 remain the same, but layer 22 has been shifted so as to become the innermost layer of the coil 33, while layers 23 and 24 have been transferred to coil 32 with layer 23 being the outermost layer of coil 32 and layer 24 being the innermost layer of coil 32. Thus, when the secondary winding of Fig. 4 is connected for 50% voltage raising operation, the load current, in flowing from raise end tap 8 through sections 21, 22, 23, and 24 in series to the effective midtap 13 for such operation, will produce substantially equal heating effects in both of the coils 32 and 33 so that all four coil sides are available for getting rid of the heat developed by the resistance losses. Likewise, when the winding of Fig. 4 is connected for 50% voltage lowering operation, the current, in flowing from the lower end tap 9 to the virtual midtap 14 for lowering operation, will flow through sections 29 and 28 which are intermediate layers in coil 33 and through sections 27 and 26 which are intermediate layers in coil 32 so that again the side areas of both coils 32 and 33 will be available for cooling.

It will be observed in Fig. 4 that the layers 21, 22, 23, and 24, which are used for voltage raising action, are nearest the surfaces of the coils 32 and 33 so that heat generated by the resistance losses therein will more readily find its way out of the coils than heat generated in the intermediate layers which are used during 50% voltage lowering operation. As has been previously explained, the current in the series winding is greater than the load current during voltage raising operation of the regulators and is less than the load current during voltage lowering operation of the regulator so that, by this relative arrangement of the layers, there is a corresponding difference in cooling effects so that the maximum safe load current for 50% lowering and 50% raising operation can more nearly be equalized. Another advantage of increasing the heat dissipating ability of the "raise" half of the winding relative to the "lower" half of the winding is that the load current is usually higher when the regulator is called upon to raise voltage than when it is called upon to lower voltage.

It will also be observed that the coil section or layer 25 which is not used during either 50% voltage raising or lowering operation has been placed at the center of the inner coil 32, this being the least favorable location for heat dissipation.

In Fig. 5 the nine-section, two-coil winding 4 of Fig. 4 has been rearranged so that there are only five layers instead of nine. Thus the inner coil 32 is shown as having two two-section layers and the outer coil 33 is shown as having two two-section layers plus an outer layer having only one section. All of the sections are serially connected but the arrangement is such that between the raise end tap 8 and the virtual midtap 13 the half of the winding containing the sections 21, 22, 23, and 24 is in layers which are directly adjacent the cooling duct 34. Likewise the half of the winding used for voltage lowering is between the lower end tap 9 and the virtual midtap 14 with sections 29, 28, 27 and 26 in series. The heat dissipating ability of this portion of the winding is not quite as good as the other half of the winding due to the fact that the section 26 is in the intermediate or midlayer of the coil 33. The section 25 which is inactive when half of the winding is being used for either voltage raising or voltage lowering is also in the middle layer of the coil 33.

In Fig. 6, the secondary winding 4 has been divided into four coils with layers 21 and 29 constituting the outermost coil, layers 22 and 28 constituting the next outermost coil, layers 23 and 27 constituting the next innermost coil, and layers 24, 25 and 26 constituting the innermost coil. Thus, for both 50% voltage raising and 50% voltage lowering action, there is an active layer in each coil and each active layer is directly adjacent one of the sides of its respective coil.

Fig. 7 shows a modified form of step regulator circuit in which the full range is not obtained by going from a maximum raise condition with all of the series winding connected in the circuit with one polarity through a zero or neutral position to a maximum lower condition with all of the series winding connected in the circuit with reverse polarity, as in Fig. 1. On the contrary, means are provided for selectively operating the secondary winding between a condition of 100% voltage raise and zero, or 100% voltage lowering and zero, or between 50% voltage raising through zero to 50% voltage lowering, or from 25% voltage raising through zero to 75% voltage lowering, or vice versa. In this circuit, the secondary winding is provided with a raise end tap 36, a lower end tap 40 and with three intermediate taps 37, 38, and 39, of which tap 38 constitutes a true electrical midtap of the winding. This winding is divided into an outer coil constituting layers 42 and 43 and an inner coil constituting layers 44 and 45, all layers being connected in series between the taps 36 and 40.

The switching mechanism shown in Fig. 6 consists of two effectively parallel connected dial switches having fixed contacts arranged in a circle and identified by primed reference numerals corresponding to those of the taps to which they are connected. The movable contacts of the dial switches are sequentially operated in a follow-up manner by any suitable well-known mechanism and they are connected, respectively, to opposite ends of midtap reactor 20 whose midtap is one terminal of the series part of the regulator. The other side of the circuit for the series winding is selectively connected by means of a connection changer 41 to any of the fixed contacts of the dial switches. As shown, it is connected to the fixed contact 38' corresponding to the electrical midtap 38 of the winding. Both movable contacts of the dial switches are shown in contact with their fixed contacts 40' which, in turn, connect to the lower end tap 40 of the winding so that the regulator is in its 50% voltage lowering position and current will flow from the connection changer 41 through the midtap 38 and the layers 43 and 45 in series through the lower end tap 40 to the contact fingers of the two dial switches in parallel and then through two halves of the reactor 20 to the other side of the system. Here again, it will be observed that both sides of the coils of the series winding will be available for cooling.

If the contact fingers of the dial switches are both moved so as to engage the contacts 36', the regulator will be in its 50% voltage raising position, in which case the current will flow through the sections or layers 42 and 44 in series.

The position of the connection changer 41 shown in Fig. 7, therefore, corresponds to a range of the regulator from 50% raise through zero to 50% lower. By having the connection changer 41 make contact selectively with any of the other fixed contacts of the dial switches or taps of the winding, the operating range of the regulator may be varied to provide the different ranges of regulation which have been previously referred to.

While there have been shown and described particular embodiments of the invention, it will be apparent to one skilled in the art that changes and modifications may be made without departing from the invention, and it is intended in the appended claims to cover all such changes and modifications as fall within the true spirit and scope of the invention.

What I claim as new and desire to secure by Letters Patent of the United States is:

1. In a step voltage regulator, a multi-section series winding having a plurality of radially spaced concentric cylindrical coils, said winding being provided with two end taps and a plurality of intermediate taps, said coils each having a plurality of layers each of which contains at least one section, all of said sections and layers being electrically connected in series between said end taps, said intermediate taps being connected respectively to the junctions between said sections, at least one of said intermediate taps being a virtual electrical midtap for said winding, the two sets of sections which are electrically in series between said virtual midtap and said two end taps being physically distributed in substantially equal numbers of sections in each of said coils.

2. In a step voltage regulator, a series winding having a plurality of radially spaced coaxial cylindrical coils, said winding being provided with two end taps and a plurality of intermediate taps, said coils each having a plurality of layers, all of said layers being electrically connected in series between said end taps, said intermediate taps being connected respectively to the junctions between said layers, at least one of said intermediate taps being a virtual electrical midtap, the two sets of layers which are electrically in series between said virtual midtap and said two end taps being physically distributed in substantially equal numbers of layers in each of said coils.

3. A series winding for a step voltage regulator comprising, a plurality of radially spaced coaxial cylindrical coils, said winding being provided with a plurality of taps including two electrical end taps and a virtual electrical midtap, each of said coils having a plurality of layers all with the same number of turns, all of said layers being serially connected between said two end taps, the two sets of layers which are electrically in series between said midtap and said two end taps being physically distributed in substantially equal numbers of layers in each of said coils.

4. A series winding for a step voltage regulator comprising, a plurality of radially spaced coaxial cylindrical coils each having substantially the same numbers of layers of the same number of turns each, all of said layers being serially interconnected between a raise end tap and a lower end tap, the layers which are between the electrical midpoint of said winding and said raise end tap comprising the radially outermost layers of all of said coils.

5. A series winding for a step voltage regulator comprising, two radially separated concentric cylindrical coils, the outer coil having four layers and the inner coil having at least four layers, all of said layers having the same number of turns, a raise end tap and a lower end tap for said winding, all of said layers being additively connected in series between said end taps, each half of said winding having an equal amount in both coils, the half which is connected to said raise end tap comprising the inner and outer layers of the coils and the half which is connected to said lower end tap comprising the intermediate layers of said coils.

6. A series winding for a step voltage regulator comprising, two radially spaced concentric cylindrical coils, the outer coil having four layers, the inner coil having five layers, all of said layers having the same number of turns, said layers all being additively connected in series, intermediate taps connected to the junctions between said layers, a raise end tap connected to one end of the outer layer of the outer coil and a lower end tap connected to one end of the next outermost layer of the outer coil, said layers being physically distributed between said coils in the following sequence: from the raise end tap through the outermost layer of the outer coil, then through the innermost layer of the outer coil, then through the outer layer of the inner coil, then through the inner layer of the inner coil, then through the center layer of the inner coil, and then through the intermediate layers of both coils to the lower end tap.

7. A series winding for a step voltage regulator, said winding having two radially spaced cencentric multilayer coils the outer of which has an even number of layers and the inner of which has one more layer than the outer one, said layers all being serially connected additively, taps connected to the junctions between said layers, the layers between a tap connected to one end of the center layer of the inner coil and one end of said winding being equally distributed among said coils, and the layers between the tap connected to the other end of the center layer of the inner coil and the other end of said winding also being equally distributed among said coils.

8. A winding as in claim 6 in which the outer coil has four layers, the inner coil has five layers, all of the layers between one end of said winding and a tap connected to the center layer of the inner coil are outside layers of said coils and all of the layers between the other end of said winding and the other tap connected to said center layer of said inner coil are intermediate layers of said coils.

9. A multi-section series winding for a step voltage regulator comprising, a pair of concentric cylindrical coils, one of said coils having three layers and the other one having two layers, all of said layers except one having two sections of the same number of turns with said one layer having one section of the same number of turns of the other sections, all of said layers and sections being serially interconnected between two end taps for said winding connected to the free ends of two different layers, and intermediate taps connected to the junctions between sections.

10. A nine-section series winding for a step voltage regulator comprising, a pair of concentric cylindrical coils, the outer of said coils having three layers and the inner coil having two layers, all of said layers having two sections of the same number of turns except the outer layer of the three-layer coil which has one section of the same number of turns as the other sections, all of the said sections being serially connected between end taps on said winding in the following manner: from one end tap through said one-section layer then through the inner layer of the inner coil, then through the middle layer of the outer coil, then through the outer layer of the inner coil and then through the inner layer of the outer coil to the other end tap, and intermediate taps for said winding connected to the junctions between sections.

11. A series winding for a step voltage regulator, said winding having four concentric cylindrical coils each of which has two layers except the innermost coil which has three layers, all of said layers having the same number of turns, all of said layers being serially connected additively in the following manner: from one end of the center layer of the innermost coil through the four outer layers of all four coils and from the other end of the center layer of the innermost coil through all four of the inner layers of all four coils, and intermediate taps connected to the junctions between said layers.

12. A series winding for a step voltage regulator, said winding comprising four concentric cylindrical windings the three outermost of which have two layers and the innermost of which has three layers, all of said layers having the same number of turns, all of said layers being additively connected in series in the following sequence: from one end of the outer layer of the outer coil through that coil, then through the outer layer of the next outermost coil, then through the outermost layer of the next innermost coil, then through the outer layer of the innermost coil, then through the center layer of the innermost coil, then through the innermost layer of the innermost coil, then through the innermost layer of the next innermost coil, then through the innermost layer of the next outermost coil, and then through the innermost layer of the outer coil, and intermediate taps connected to the junctions between layers.

13. A series winding for a step voltage regulator comprising, two concentric cylindrical coils, each coil having two layers, all of said layers having the same number of turns, all of said layers being serially connected additively, intermediate taps connected to the junctions between said layers whereby one of said taps is an electrical midtap of said winding, said layers being distributed among said coils so that between said electrical midtap and one end of said winding the two layers are on different coils and between said midtap and the other end of said winding the other two layers are on different coils.

References Cited in the file of this patent
UNITED STATES PATENTS

| Number | Name | Date |
|---|---|---|
| 2,146,914 | Rauhut | Feb. 14, 1939 |
| 2,542,851 | Wentz et al. | Feb. 20, 1951 |